United States Patent [19]

Schattauer

[11] 3,952,863

[45] Apr. 27, 1976

[54] CLEANING APPARATUS FOR ENDLESS BELT INSTALLATION

[76] Inventor: Manfred Schattauer, Ledderken 8, D 581 Witten, Germany

[22] Filed: Apr. 15, 1974

[21] Appl. No.: 460,903

[30] Foreign Application Priority Data

Apr. 18, 1973  Germany............................ 2319736

[52] U.S. Cl. ............................................. 198/230
[51] Int. Cl.² ....................................... B65G 45/00
[58] Field of Search ............... 198/230, 188; 74/230

[56] References Cited

UNITED STATES PATENTS

| | | | |
|---|---|---|---|
| 1,975,591 | 10/1934 | Sinden | 198/230 |
| 2,393,724 | 1/1946 | Vickers | 198/230 |
| 3,362,525 | 1/1968 | Fehr | 198/230 |
| 3,504,786 | 4/1970 | Matson | 198/230 |
| 3,631,968 | 1/1972 | Ward | 198/230 |
| 3,782,534 | 1/1974 | Holleman | 198/230 |
| 3,795,308 | 3/1974 | Oury | 198/230 |
| 3,841,470 | 10/1974 | Meguro | 198/230 |

FOREIGN PATENTS OR APPLICATIONS 58,900  11/1967  Germany ............................ 198/230

*Primary Examiner*—Evon C. Blunk
*Assistant Examiner*—Jeffrey V. Nase

[57] ABSTRACT

An endless belt installation has a cleaning apparatus which comprises a carrier extending transversely of said belt, a series of scraper elements carried by said carrier and extending across said belt, means separately rockably mounting said elements on said carrier, and spring means urging said elements to rock in a direction into engagement with said belt surface.

9 Claims, 13 Drawing Figures

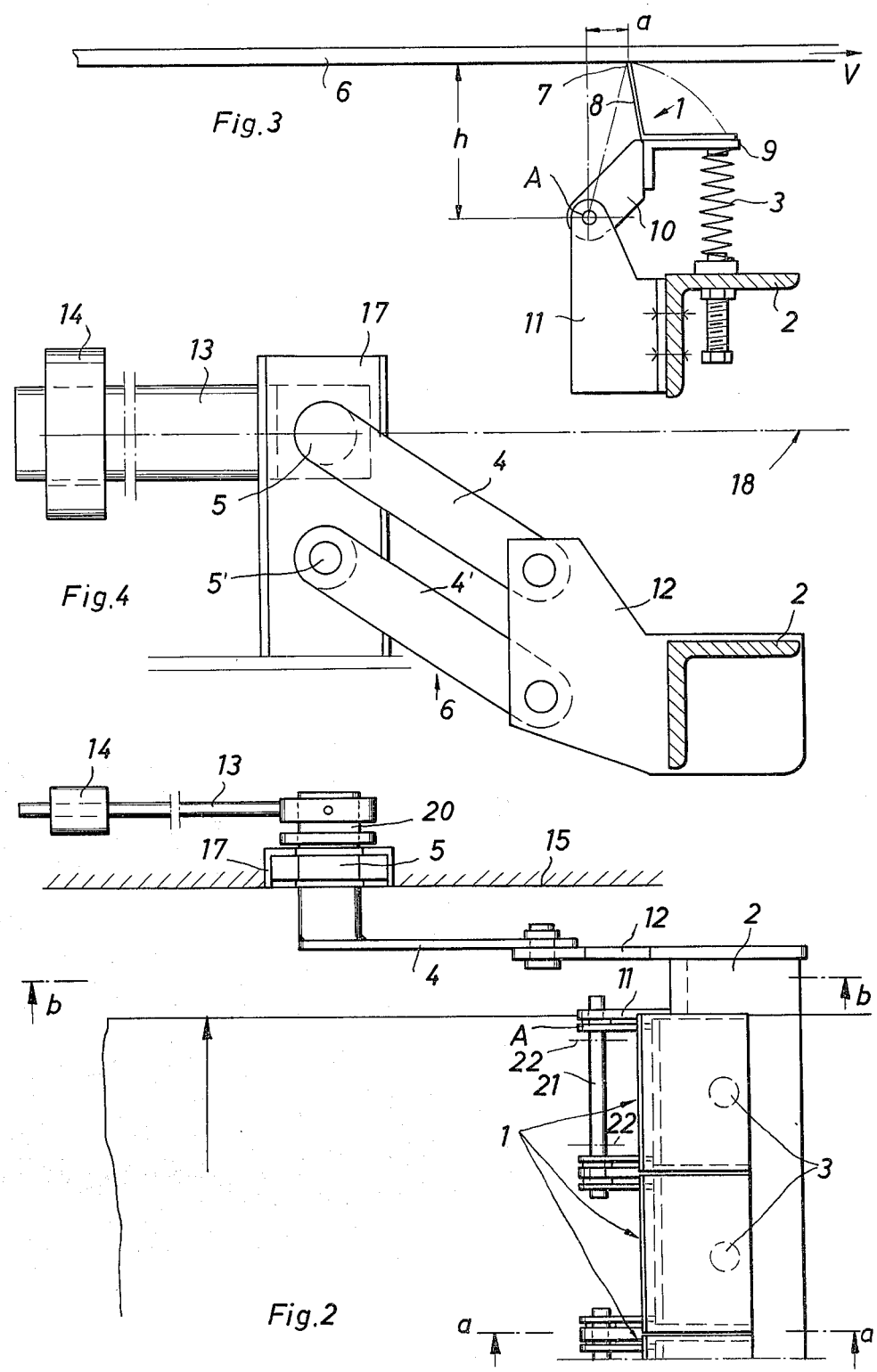

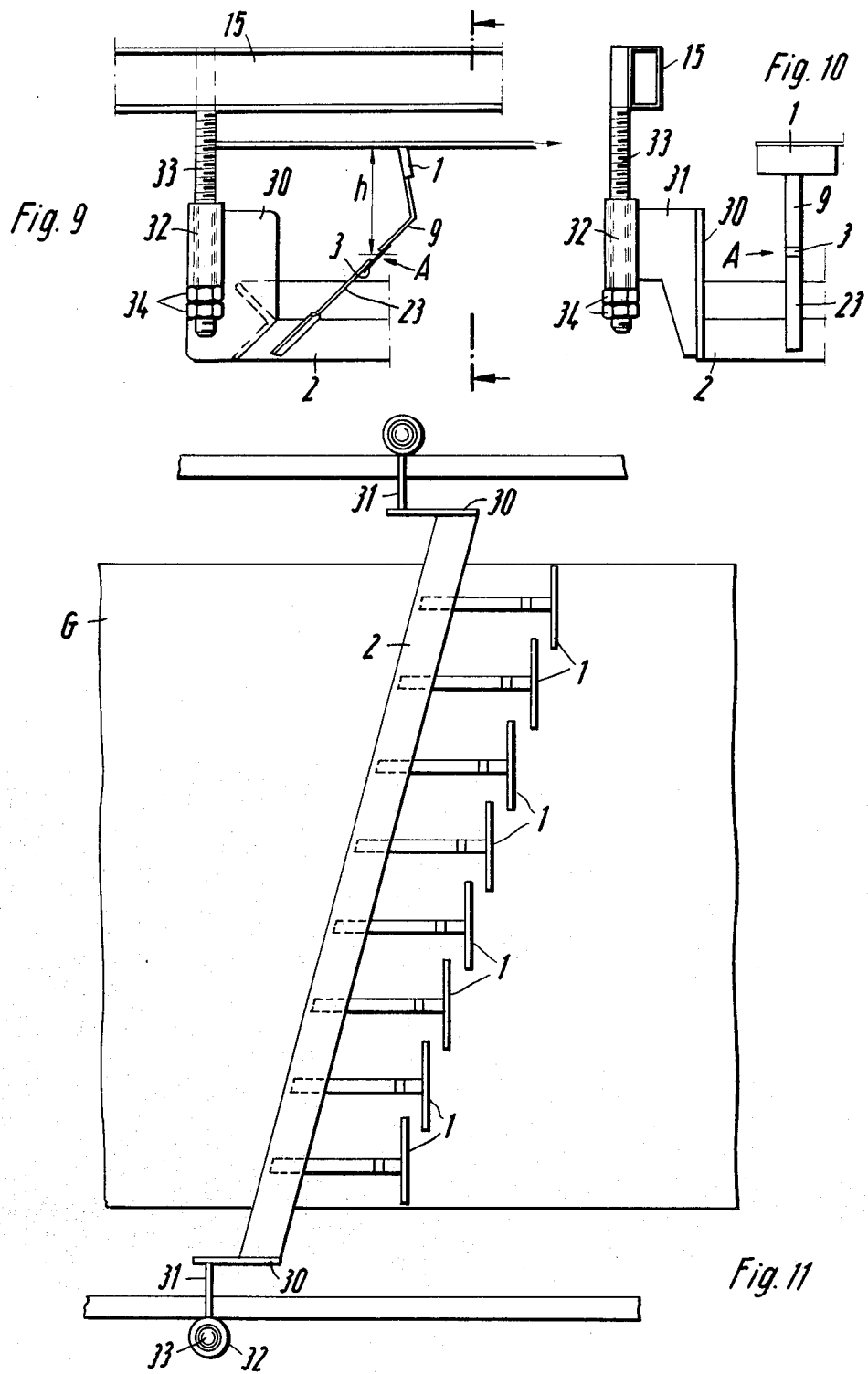

CLEANING APPARATUS FOR ENDLESS BELT INSTALLATION

The invention refers to cleaning apparatus for endless belt installations, having a scraper to be pressed against a surface, usually a lower run, of the belt.

If belt installations are employed for the conveyance of material which tends to adhere to the belt the surface of the belt must be continuously cleaned. For this purpose a cleaning apparatus is usually employed at the discharge end underneath the belt, the scraper of which is pressed from below against the underside of the belt for stripping off adhering material. Inadequate cleaning of the belt in the region of the normal material discharge point has the consequence that the material adhering to the surface of the belt returns along the idle run and over the idler and pressure pulleys. The quantities of material dropping off and thereby accumulating underneath the installation may be so large that, particularly with fast running belts with high conveyor capacity, the soiled installations must be cleaned at frequent intervals. This work of cleaning requires a great effort by staff and correspondingly high expense.

With known cleaning apparatus a continuous scraper bar is pressed against the surface of the belt to be cleaned, a carrier holding the scraper bar being supported pivotally by two levers mounted adjacent to the belt and loaded by means of springs or counterweights. However the scraper bar does not always lie along its whole length in contact with the surface of the belt to be cleaned, since the belts often exhibit unevennesses because of small pieces of adherent material, or damaged or uneven sections of belt. The scraping effect is thus reduced. In addition, because of the low stiffness of the thin belt no constant contact pressure can be achieved across the whole width of the belt. Projections such as unevennesses in the surface of the belt to be cleaned or contaminations not detachable by the scraper or small pieces of material, as well as oscillations in the belt cause the whole scraper bar to be raised from the surface of the belt so that more or less wide sections of belt ride past the scraper bar uncleaned.

This phenomenon has a particularly disadvantageous effect with fast running belts and reduces the cleaning effect considerably as the scraper bar, because of the high inertia of the system consisting of the lever mounting, the counterweight and carrier, cannot follow the face of the belt and consequently wide sections of belt remain uncleaned before the scraper bar after being raised comes once more into contact with the surface of the belt to be cleaned. In order to counteract this phenomenon the contact forces are made relatively high. At the same time, however, scraper bars of soft material must be employed, since otherwise the soft belts suffer high wear or get damaged. With scraper bars of soft material, on the other hand, no stable sharp cutting edge for separating the adhering material from the belt can be formed, because this formation presupposes the employment of rather hard materials.

The object of the invention is to provide in as simple a construction as possible an increase in the scraping effect.

In accordance with the invention, cleaning apparatus for an endless belt installation comprises a carrier which is arranged to be mounted so that it extends transversely across a belt and which carries a series of scraper elements also extending across the belt in use, the elements being separately mounted to rock on the carrier and being urged by spring action to rock in a direction in use into engagement with the surface of the belt to be cleaned.

With this new cleaning apparatus is achieved above all a considerably improved dynamic behaviour of the scraper bar which is thus divided up into a plurality of individual scraper elements providing individual systems exist with relatively small dimensions and correspondingly small inertia. In consequence each scraper element which is rockable independently of the position and movement of the remaining elements can easily follow the contour of its own longitudinal strip of belt, even in the case of fast running belts. The short lever arm and the comparatively soft spring of each element, which provides a high natural frequency, contributes considerably to this effect. Moreover when encountering unevennesses in the belt such, for example, as at the joins in the belt, no high forces can occur against the cutting edge of the scraper element since with the small mass of the individual element only small forces are necessary for accelerating the element and forcing to deflect it rapidly so that the belt, in spite of a continuous engagement with the scraper elements, is protected and suffers only comparatively small wear. Insofar as defects in the belt are encountered, these are neither worsened nor can they reduce the cleaning effect.

A further considerable advantage of the new cleaning apparatus lies in the fact that the total contact pressure, and the bearing pressure of the carrier alone can be better adjusted in accordance with the pressure necessary for the separation of the material from the belt. Consequently as compared with known cleaning apparatus the necessity is removed of selecting the contact pressure of the carrier so that the scraper bar, after a possible lift, comes by increased bearing pressure as quickly as possible into contact again with the surface of the belt to be cleaned.

The employment of a comparatively low total contact pressure allows the scraper elements to be produced from fairly hard material which creates the prerequisite for the formation of a sharp stable scraping edge. Thus it is, for example, possible to produce the elements from metal and in this way considerably to increase both the scraping effect and the life of the scraping elements.

When the cleaning apparatus is fitted to a belt installation, the rocking axis of each scraper element, as seen in the direction of running of the belt, preferably lies a short distance $a$ in front of the scraping edge of the element and the rocking axis is spaced a distance $h$ from the surface of the belt to be cleaned, which distance $h$ is appreciably greater than the distance $a$. The distance $h$ is preferably between two and ten times the distance $a$. With this position of the rocking axis, jamming of the scraper elements against unevennesses in the surface of the belt to be cleaned is prevented and the elements can, upon the occurrence of high horizontal loads such as arise when the cutting edges encounter damaged sections of the belt, easily deflect onto a path running first of all approximately tangential to the belt and lift quickly from the belt against the pressure of their spring loading.

In order to achieve the highest possible stripping capacity it is extremely advantageous if each scraper element has a blade which engages the surface of the belt to be cleaned at an angle of attack such that the approaching belt surface forms an obtuse angle with the blade. The adhering material is then easily peeled or skinned off the belt by the scraper elements.

In one construction, each scraper element is fastened to a separate support which is mounted at one side on arms pivoted to brackets fastened to the carrier, and which is supported at the other side by a spring.

Alternatively each scraper element may be fastened to a separate support which is mounted on the carrier by a springy flexible intermediate piece, such as a short leaf-spring, which both bends to provide the rocking movement of the element and provides the spring action for urging the element in use against the surface of the belt to be cleaned.

The carrier itself may be mounted via a weight- or spring-loaded mounting which urges the carrier and elements in use towards the belt. The mounting may incorporate a parallel motion linkage loaded by a weighted arm. When the cleaning apparatus is mounted for cleaning a lower run of the belt, a fixed hinge axis of an upper lever of the parallel motion linkage at each side of the belt is substantially at the height of the lower run of the belt.

The parallel motion linkage causes the carrier with the scraper elements, upon vertical deflection, to move substantially parallel with the surface of the belt to be cleaned and the pre-tensioning of the springs having once been set, the angle of attack, that is the cutting angle set between the belt and the scraping elements, does not change even with wear of the scraper elements. Knife-sharp constant cutting edges can be formed, particularly on scraper elements of hard material such as metal.

In accordance with another example the mounting may comprise slide rails arranged to be mounted at opposited edges of the belt, the carrier being slidably supported by the slide rails, under simultaneous spring- or weight-loading. With this kind of mounting the necessary parallel displacement of the carrier with respect to the belt is likewise guaranteed.

In many cases, above all when small wear of the scraper elements (e.g., of metal) can be expected, it is adequate if the carrier is not supported movably with respect to the belt under weight- or spring-loading, but is adjustably fixed on the frame of the installation in side guides at a selectable distance from the belt. The contact forces of the individual scraper elements are in this case applied by vertical adjustment of the carrier towards the belt.

It is also possible to arrange so that the scraper elements act from above on the surface of the belt to be cleaned. The total contact force is applied, depending upon the construction of the cleaning apparatus, for example, by the inherent weight of the scraper elements and the carrier, whilst an external lever or spring system serves for reducing this force down to the required magnitude.

Instead of being arranged side by side in a row, the scraper elements may be arranged so that the carrier and series of scraper elements are arranged to extend obliquely to the longitudinal direction of the belt, or are shaped in the form of an arrow head, or the scraper elements may be offset with respect to one another in use in the longitudinal direction of the belt or offset with respect to one another in use in the direction transversely or longitudinally of the belt overlapping one another.

Two examples of belt installations fitted with cleaning apparatus according to the invention are illustrated in the accompanying drawings, in which:

FIG. 2 is a plan of part of the cleaning apparatus of FIG. 1;

FIG. 3 is a diagrammatic section taken on the line $a-b$ in FIG. 2;

FIG. 4 is a diagrammatic section taken on the line $b-b$ in FIG. 2;

FIG. 9 is a diagrammatic section of another example with parts broken away;

FIG. 10 is a front elevation to FIG. 9;

FIG. 11 is a plan view to FIGS. 9 and 10;

Figure 1:
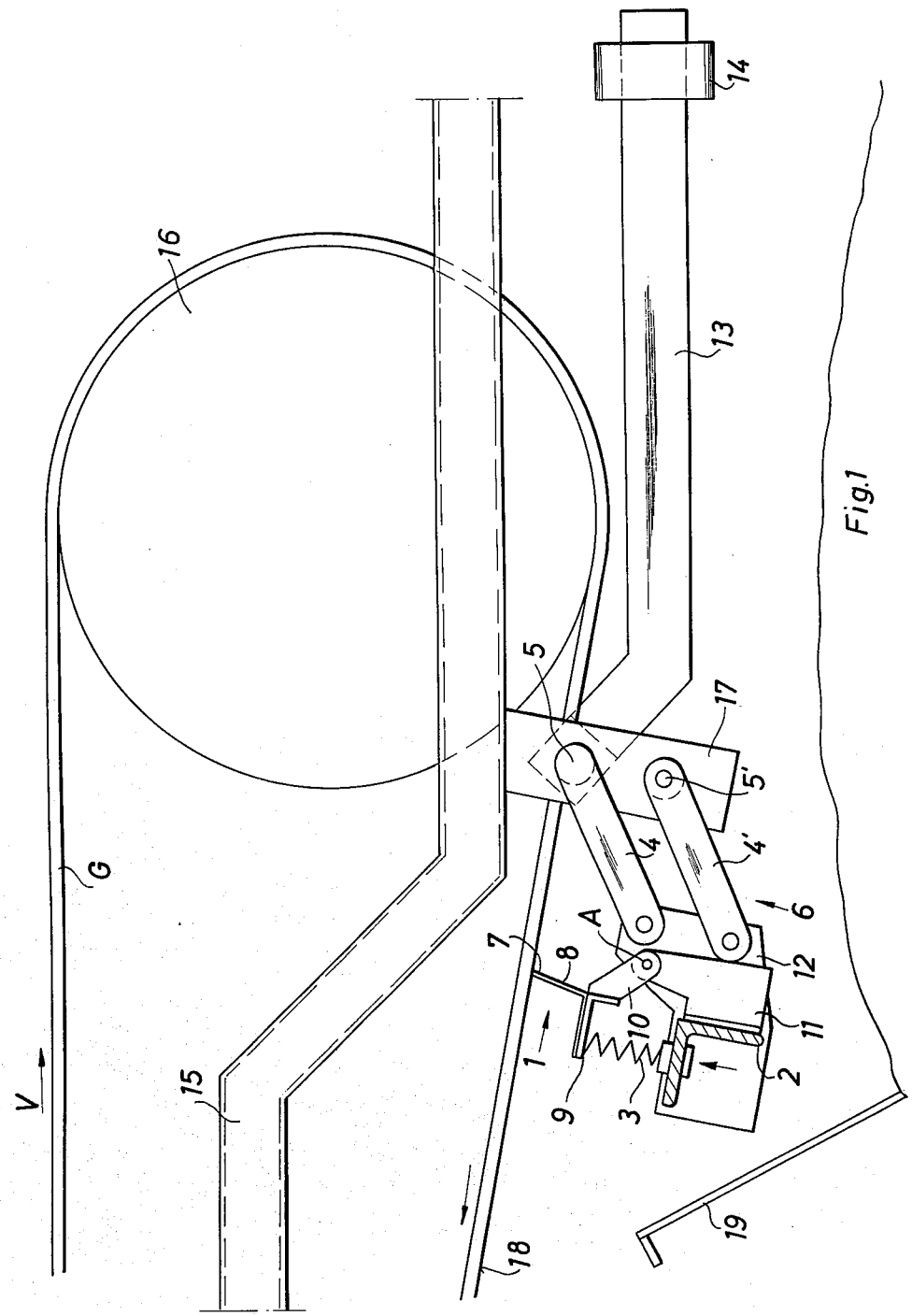
FIG. 1 is a diagrammatic side elevation of the discharge end of one belt installation.

FIG. 1 shows the discharge end of a conveyor belt installation, the belt G of which runs round a discharge pulley 16 at which the conveyed material falls into a receiver container 19. On a support 17 on a frame 15 of the belt installation a carrier 2 extending across the width of the belt G is supported pivotally by a parallel motion linkage 6 which brings a number of scraper elements 1 into contact against the undersurface 18 of the belt.

As seen in FIGS. 1 to 4 the parallel motion linkage 6 consists of two levers 4, 4' at each side of the belt. In the parallel position the levers are coupled at their one ends to one of two side plates 12 which hold the carrier 2 between them. The other end of the upper lever 4 is connected solidly with a shaft 5 supported rotatably in the support 17, to the other end of which is fitted, for example by a split-pin, a lever 13 loaded by means of a slidable weight 14. In the drawings only one side of the linkage 6 and its attachments are represented, since the formation is the same on both sides of the belt. The other end of the lower lever 4' is supported on the support 17 pivotally at a pivot 5'.

As may be seen from FIGS. 1 to 3, the angular scraper elements 1 are each attached at its lower flange to a support 9 fixed to two arms 10 which are supported pivotally about a pivot A on brackets 11 attached to the carrier 2. The pivotal support can be effected, for example, on continuous shafts 21 (FIG. 2) or else on short hinge pins as is indicated by the lines of separation 22 in FIG. 2.

It is very important that the axis of rotation A — seen in the direction of running of the belt — lies a very small distance $a$ in front of the cutting edge 7 a blade 8 of each element 1 so that the cutting edge 7 can perform a pivotal movement as is indicated by the dash-dot line in FIG. 3. Furthermore it is for this purpose important that the axis of rotation A lies underneath the undersurface of the belt a distance $h$ which is very large in comparison with the distance $a$, so that the cutting edge 7 cannot catch on unevennesses in the undersurface 18 of the belt and can deflect approximately tangentially.

On the side opposite to the axis of rotation A each support 9 bears against a helical compression spring 3 the level of which, as seen in FIG. 3, is adjustable with respect to the carrier 2. The method of working of the cleaning apparatus is as follows:

The carrier 2 is forced via the parallel linkage 6, under adjustable loading from the weight 14, in the direction towards the undersurface 18 of the belt, so that the elements 1 lying in a row one beside the other come with their cutting edges 7 into engagement with the undersurface 18 of the belt.

Because of the oblique position of the blades 8 of the elements 1 as shown, material adhering to the undersurface 18 of the belt is peeled or cut off and falls into the receiver container 19. In order that the cleaning apparatus is not soiled by the material dropping off, the apparatus can be lightly covered over, for example, by a foil off which the material can slide. The total contact pressure of the system given by the weight 14 can be distributed in any required proportion on the individual elements 1 by setting their springs 3 accordingly. Thus it is, for example, possible to let the elements act on individual longitudinal sections of the belt with higher contact pressure than in other zones.

If an unevenness on the undersurface 18 of the belt confronts the cutting edge 7 of one of the elements 1, that element 1 can very quickly and easily deflect against the pressure of its spring 3, whilst all the other elements 1 remain largely unaffected by this movement and furthermore in engagement with the belt. The scraper bar divided up in the manner of the invention into individual elements 1 can consequently follow very accurately the contour of the undersurface of the belt at any time. Under the influence of the springs 3, which are preferably set to be soft, each deflected element 1 springs back into its stripping position immediately after the unevenness in the belt has passed by.

The elements 1 preferably consist of a hard material on which a sharp stable cutting edge can form. Brass or steel sheet can, for example, be employed. In many applications the choice of a hard plastics is also advantageous.

Figure 6:
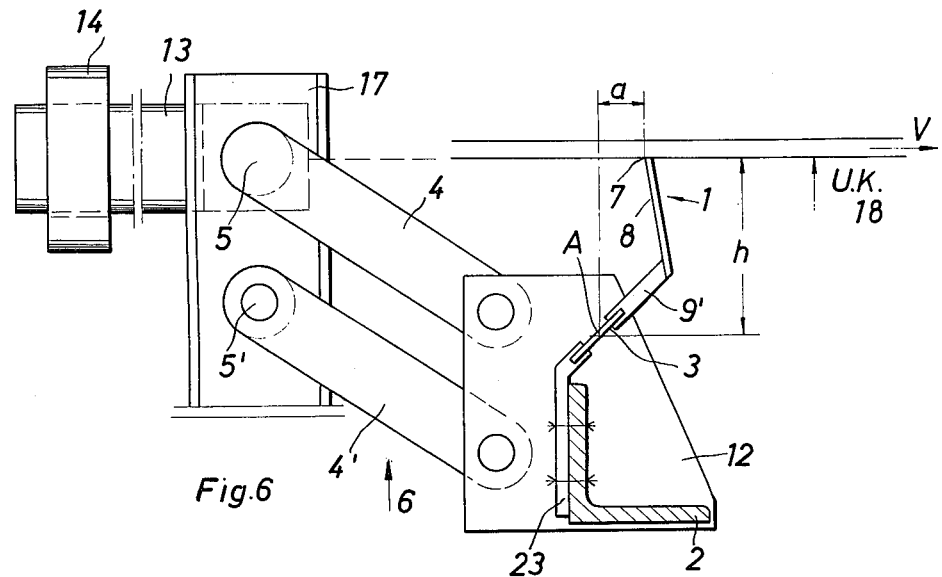
FIG. 6 is a diagrammatic section taken on the line $a-a$ in FIG. 5.
Figure 5:
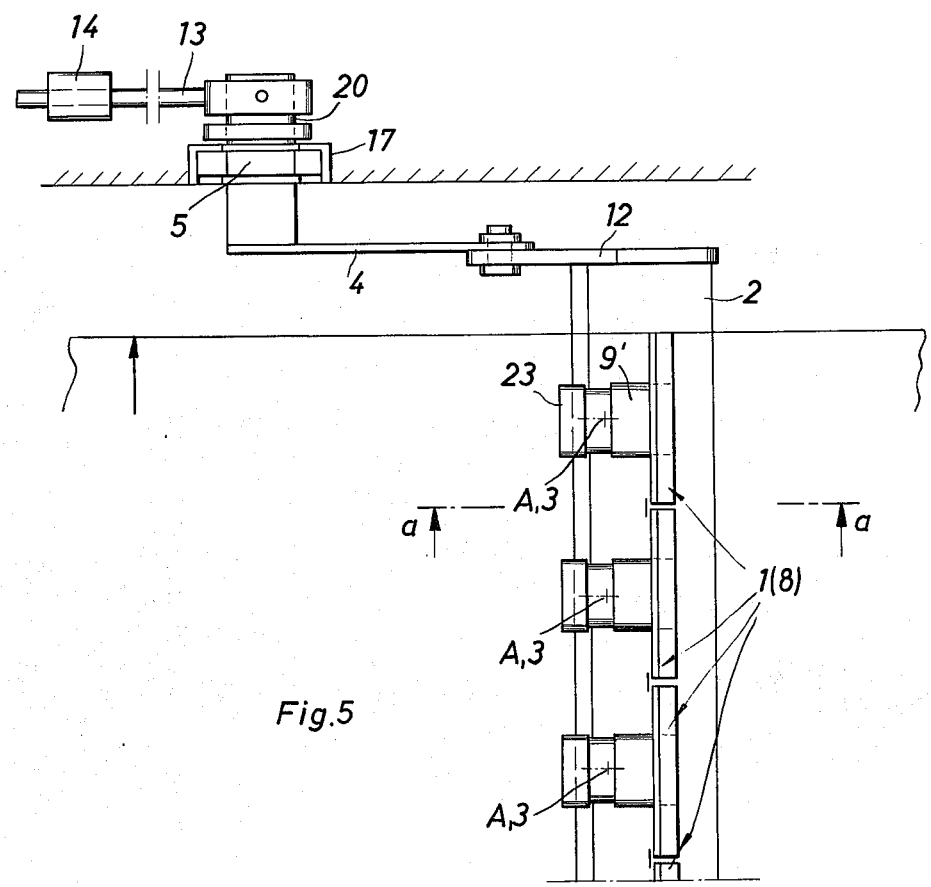
FIG. 5 is a view similar to FIG. 2 but of a second example.

The example represented in FIGS. 5 and 6 works in the same way as the first example. In this structurally simpler example the support 9' is connected with the carrier 2 by a spring mechanism 3 formed as a short leafspring, with the interposition of a part 23.

The leafspring in this case takes over both the function of the axis of rotation A and the spring by which the scraper blade 8 is pressed against the undersurface 18 of the belt. The coupling of the carrier 2 is the same as in the first example.

Figure 7:
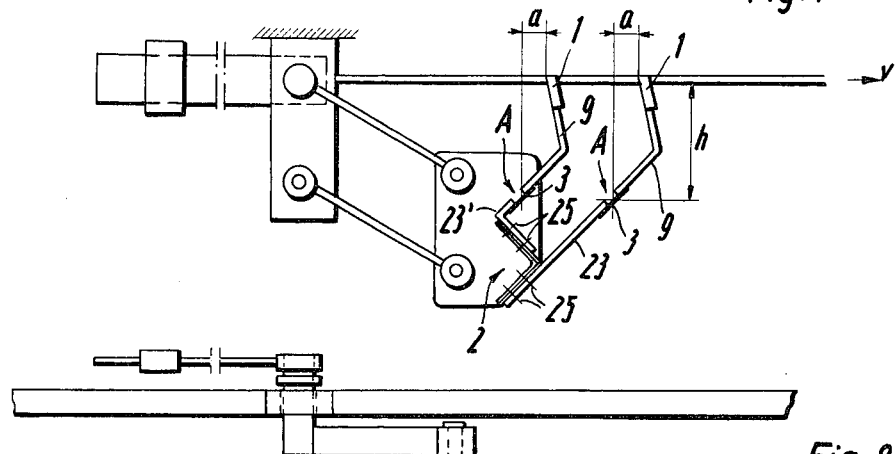
FIG. 7 is a diagrammatic section of a particularly preferred embodiement.
Figure 8:
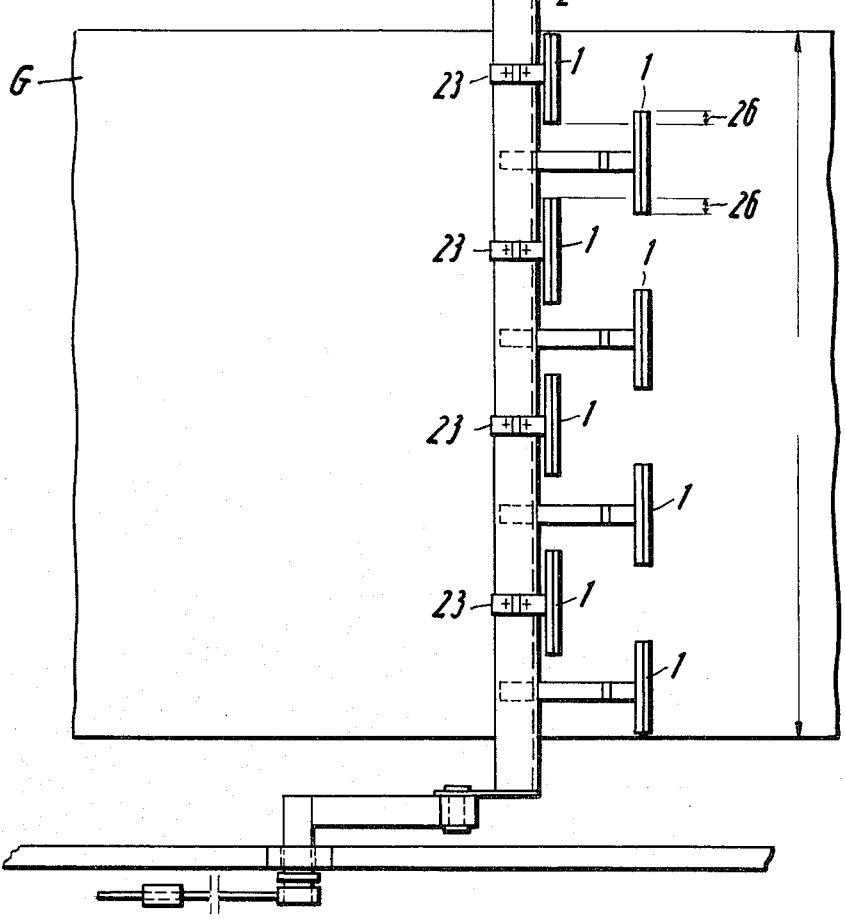
FIG. 8 is a plan view of the apparatus according to FIG. 7.

In the case of the preferred embodiment according to FIGS. 7 and 8 the carrier 2 is in the same way mounted as in FIGS. 2 and 4. The scraper elements 1 are offset with respect to one another in the direction transversely or longitudinally of the belt G overlapping one another. The parts 23, 23' have slotted holes at 25 for being adjustably fixed to the carrier 2 by means of bolts and nuts. The arrows 26 show the extent of overlapping of the scraper elements 1.

Figure 12:
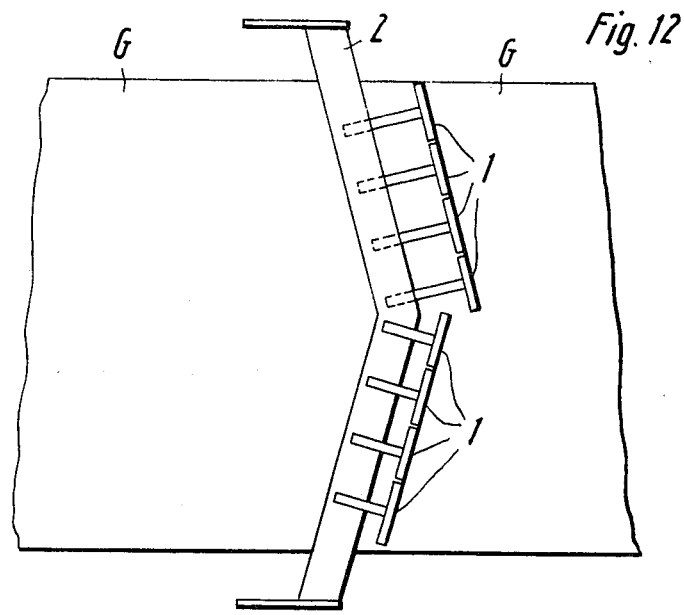
FIGS. 12 and 13 are plan views of different arrangements of the scraper elements.
Figure 13:
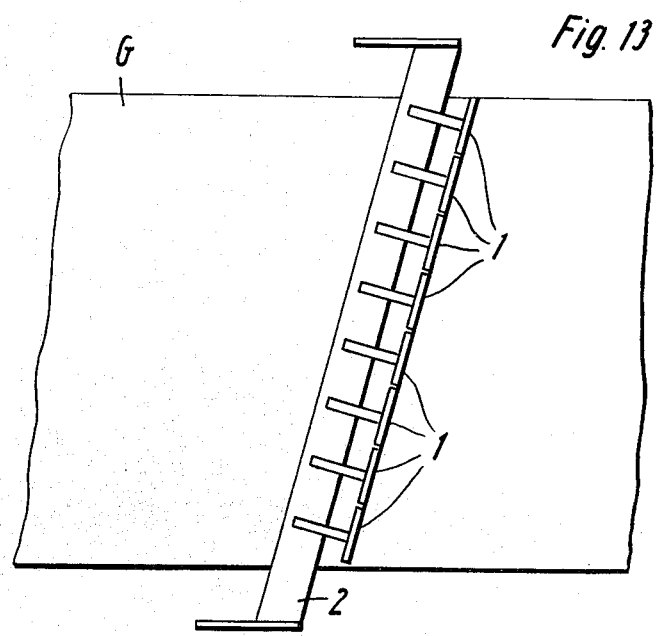

In the example according to FIGS. 9, 10 and 11 the carrier 2 is provided on each side with plates 30, 31 and a bushing 32 threaded internally for engagement with an externally threaded vertical guide 33 of the frame 15 so that the carrier can be adjustably fixed at these side guides 33 at a selectable distance from the belt G and secured by means of nuts 34. In this case the carrier 2 can be positioned oblique and provided with scraper elements 1 overlapping each other if required. However, in some cases it may be preferable that the carrier 2 and scraper elements 1 are shaped in the form of an arrowhead (FIG. 12) or that they are arranged obliquely without overlapping one another (FIG. 13).

I claim:

1. An improved belt cleaning apparatus for cleaning the belt surface of an endless belt moving in a first direction, said belt cleaning apparatus comprising:

a scraper element having a scraping edge for contacting said belt surface to clean said belt surface, mounting arm means upon which said scraper element is mounted, said mounting arm means being movable about an axis lying at the intersection of a first plane parallel to said belt surface and spaced therefrom a first distance and a second plane perpendicular to said belt surface and spaced a second distance upstream along said belt from said scraping edge when said scraping edge is in contact with said belt, said first distance being from two to ten times the magnitude of said second distance, whereby upon deflection of said scraper element in said first direction the movement of said scraping edge about said axis defines an arc, said mounting arm means comprising an arm pivotal about said axis and a spring having one end engaging a support fixed with respect to said mounting arm means and the other end engaging said arm, said spring urging said scraping edge into contact with said belt surface.

2. The belt cleaning apparatus of claim 1 wherein said scraping edge when contacting said belt surface is at an obtuse angle to said belt surface as measured from said belt surface upstream thereof.

3. The belt cleaning apparatus of claim 1 wherein said scraping edge is made of a hard wear-resistant material.

4. The belt cleaning apparatus of claim 1 further comprising:

carrier means extending generally transversely across said belt surface, said carrier means being movable toward and away from said belt surface, said mounting arm means being carried by said carrier means.

5. The belt cleaning device of claim 4 comprising a plurality of scraper elements each with a scraping edge, each of said scraper elements being mounted on a separate one of said mounting arm means, all of said mounting arm means being carried by said carrier means.

6. The belt cleaning apparatus of claim 4 further comprising means urging said carrier means toward said belt surface.

7. The belt cleaning apparatus of claim 6 wherein said carrier means comprises a carrier member and a parallel motion linkage having at least one pair of spaced parallel arms pivotally attached on the one hand to said carrier member and on the other hand to a frame, and wherein said means urging said carrier means toward said belt surface comprises a weighted arm.

8. An improved belt cleaning apparatus for cleaning the belt surface of an endless belt, said belt cleaning apparatus comprising:

a scraper element terminating in a scraper edge for contacting said belt surface, said scraper edge being at a predetermined angle to said belt surface when contacting said belt surface, carrier means upon which said scraper element is mounted, said carrier means being movable toward and away from said belt surface between a first position wherein said scraper edge is in contact with said belt surface and a second position wherein said scraper edge is spaced from said belt surface, carrier mounting means connected to said carrier means and supporting said carrier means for movement between said first position and said second position, said carrier mounting means guiding said carrier means to maintain said scraper edge at said predetermined angle during at least the final portion of movement from said second position to said first position, said carrier mounting means comprising a parallel motion linkage having at least one pair of upper and lower parallel arms pivotally attached to said carrier means and to a frame, and means urging said carrier means toward said first position.

9. The belt cleaning apparatus of claim 8 in which said belt surface is the underside of said belt, and wherein said pivotal attachment of said upper linkage arms to said frame is at a point located substantially in a plane coplaner with said belt surface.

* * * * *